United States Patent [19]

Wenzel

[11] 4,093,436

[45] June 6, 1978

[54] URANIUM ENRICHMENT APPARATUS HAVING A CASCADE OF SEPARATING STAGES IN A SINGLE UNIT

[75] Inventor: Werner Wenzel, Spellen, Germany

[73] Assignee: NUSTEP Trenndusen Entwicklungsund Patentverwertungsgesellschaft mbH & Co. Kommanditgesellschaft, Essen, Germany

[21] Appl. No.: 725,493

[22] Filed: Sept. 22, 1976

[30] Foreign Application Priority Data

Sept. 23, 1975 Germany .............................. 2542296

[51] Int. Cl.² ............................................. B01D 51/08
[52] U.S. Cl. ......................................... 55/269; 55/277; 55/342
[58] Field of Search .................. 55/15, 17, 23, 66, 80, 55/267, 268, 269, 277, 342

[56] References Cited

U.S. PATENT DOCUMENTS

| 2,765,870 | 10/1956 | Campbell | 55/342 X |
| 2,951,554 | 9/1960 | Becker | 55/17 |
| 3,362,131 | 1/1968 | Becker | 55/17 |
| 3,683,594 | 8/1972 | Schouw | 55/342 X |
| 3,708,964 | 1/1973 | Becker et al. | 55/17 X |
| 3,877,892 | 4/1975 | Bley et al. | 55/17 |

*Primary Examiner*—Thomas G. Wyse
*Assistant Examiner*—Robert H. Spitzer
*Attorney, Agent, or Firm*—Karl F. Ross

[57] ABSTRACT

An uranium-separating apparatus having a cascade of separating stages disposed in a single unit comprises an upright column with a bottom portion, intermediate portion and top portion, subdivided by partitions into sectors. The separating elements of each stage are disposed in a respective sector and the cooling heat exchangers are located below the respective chambers while an array of compressors can be provided below these heat exchangers.

6 Claims, 2 Drawing Figures

URANIUM ENRICHMENT APPARATUS HAVING A CASCADE OF SEPARATING STAGES IN A SINGLE UNIT

Field of the Invention

The present invention relates to an apparatus for the enrichment of uranium or, more particularly, the preparation of enriched uranium for nuclear reactor purposes.

BACKGROUND OF THE INVENTION

There are known several techniques for enriching uranium or, more accurately, producing enriched uranium, i.e. producing a uranium composition having a high concentration of the fissionable isotope of uranium.

Conventional techniques include the gas diffusion system, the centrifuge system and the separating nozzle system, all of which effect a concentration of the heavier and more fissionable isotope to bring about uranium enrichment. Uranium is generally converted into a gas and, as the gaseous compound, is subjected to the separating process.

The present invention is primarily concerned with improvements in the separating nozzle approach to uranium enrichment.

Such a separation-nozzle system may be of the type described in U.S. Pat. Nos. 3,668,080, 3,708,964, 2,951,554, 3,362,131, 3,877,892 and the patents and other references of record therein and of the same class.

The separating nozzles themselves are, for example, described in U.S. Pat. No. 3,668,080 and the units, hereinafter referred to as separating-nozzle units, can be of the type described in U.S. Pat. No. 3,708,964.

As is known in connection with separating nozzle techniques, the gaseous uranium (a uranium compound in a gaseous state) is subjected to compression subsequent cooling and passage through separating-element assemblies in which the enrichment takes place.

Thus, a typical apparatus for separating nozzle enrichment of uranium or isotope separation, comprises the separating-element assembly, an associated cooler, a respective compressor and the gas ducts for supplying the gas to the resulting unit and for delivering the gas of one unit to another unit or assembly. The units of course are connected in a cascade, generally known as a separating cascade.

While it is not uncommon to provide each unit (assembly of compressor, cooler, separator and ducts) as an integrated structure, it nevertheless is the practice to provide a multiplicity of such structures in spaced-apart relationship to constitute the separating cascade. Thus, each structure of the cascade must be connected to a preceding and successive structure by additional gas lines.

The disadvantages of such systems are numerous:

Firstly, the overall assembly, comprising a number of such structural units, occupies considerable space and requires more maintenance and higher capital cost than is desirable.

Secondly, the system needs long supply lines for the gases, for the cooling water and for the electrical power.

Thirdly, the number of individual units is considerable and separate monitoring and measuring devices must be provided for each of them, thereby creating high instrumentation and monitoring costs.

Finally, the cost of setting up and transporting the numerous individual units is considerable.

From a technological point of view, moreover, it is difficult to maintain the necessary high vacuum tightness of the numerous units, connecting fittings and the like of the cascade described above, particularly since each of the units generally has a large number of weld seams which must be prepared carefully and subjected to expensive testing procedures.

Taking all of the above-mentioned disadvantages into consideration, therefore, it will be apparent that the establishment of an installation with a separating cascade as described involves considerable capital cost, while the operation of the separating cascade involves considerable maintenance, repair and replacement costs and hence the technological advantage of the separating nozzle system may be outweighed by the unit cost for enriching the uranium. Thus, while theoretically the separating nozzle system is strongly competitive with other uranium enrichment systems, especially the gas diffusion process and the ultracentrfuge process, the disadvantages enumerated above have prevented widespread acceptance of this technique.

OBJECTS OF THE INVENTION

It is the principal object of the present invention to provide an improved apparatus for the separation of isotopes and, more specifically, for the enrichment of uranium.

Another object of the invention is to provide an improved apparatus for the separation-nozzle technique of enriching uranium whereby the aforementioned disadvantages are obviated.

It is still another object of the invention to provide an apparatus for the purposes described which is of relatively low cost, high efficient, compact and easily constructed and maintained.

SUMMARY OF THE INVENTION

These objects are attained, in accordance with the invention, in an apparatus consisting of a single structural unit for the performance of the separating nozzle technique of enrichment of uranium which renders it competitive with other processes of uranium enrichment, the apparatus comprising an upright column having a lower portion, an intermediate portion and an upper portion; and a plurality of radial partitions subdividing at least the intermediate portion of the column into respective sectors which can extend into the upper and lower portions.

According to the invention, each of the sectors into the intermediate portion is provided with a separating-nozzle unit which is provided at its upstream end, advantageously in the lower portion of the column, with a cooler below which a compressor is provided.

The coolers may be located in the respective sectors while the compressors may be united into a compressor assembly below the cooling chambers formed in the lower portion of the column.

The column is, according to the invention, a completely sealed tower enclosing the separating-nozzle units, the respective coolers and the compressors as described, the tower having a removable upper portion affording access to the various units, including the separating-nozzle unit, cooling heat exchangers and compressors, to facilitate repair of these units, replacement of them collectively or individually, or maintenance thereof.

The tower can also be provided with manholes or other closable doors or windows through which the various elements and the assemblies thereof into respective units can be introduced into the tower or removed therefrom.

The three portions of the tower or column itself may be removed from one another, e.g. by a crane, the latter being also useful in lifting the individual units and parts thereof from the tower.

In any event the portions of the tower or column must be so connected as to be vacuum-tight during operation.

According to another feature of the invention, the column, at least in the region of the intermediate portion and the upper portion, is provided with a central tube-forming mounting cylinder to which the radial partition walls are attached. When $n$ separating-nozzle aggregates or units are provided ($n$ being preferably 12), the lower portion of the column may be provided with two sets of ($n/2$) stage horizontal counterdriven radial compressors. The gas ducts of the upper portion of the column can be formed by a multistage annular gas distributor with sliders for controlling the gas flow.

BRIEF DESCRIPTION OF THE DRAWING

The above and other objects, features and advantages of the present invention will bcome more readily apparent from the following description, reference being made to the accompanying drawing in which.

SPECIFIC DESCRIPTION

Figure 1:
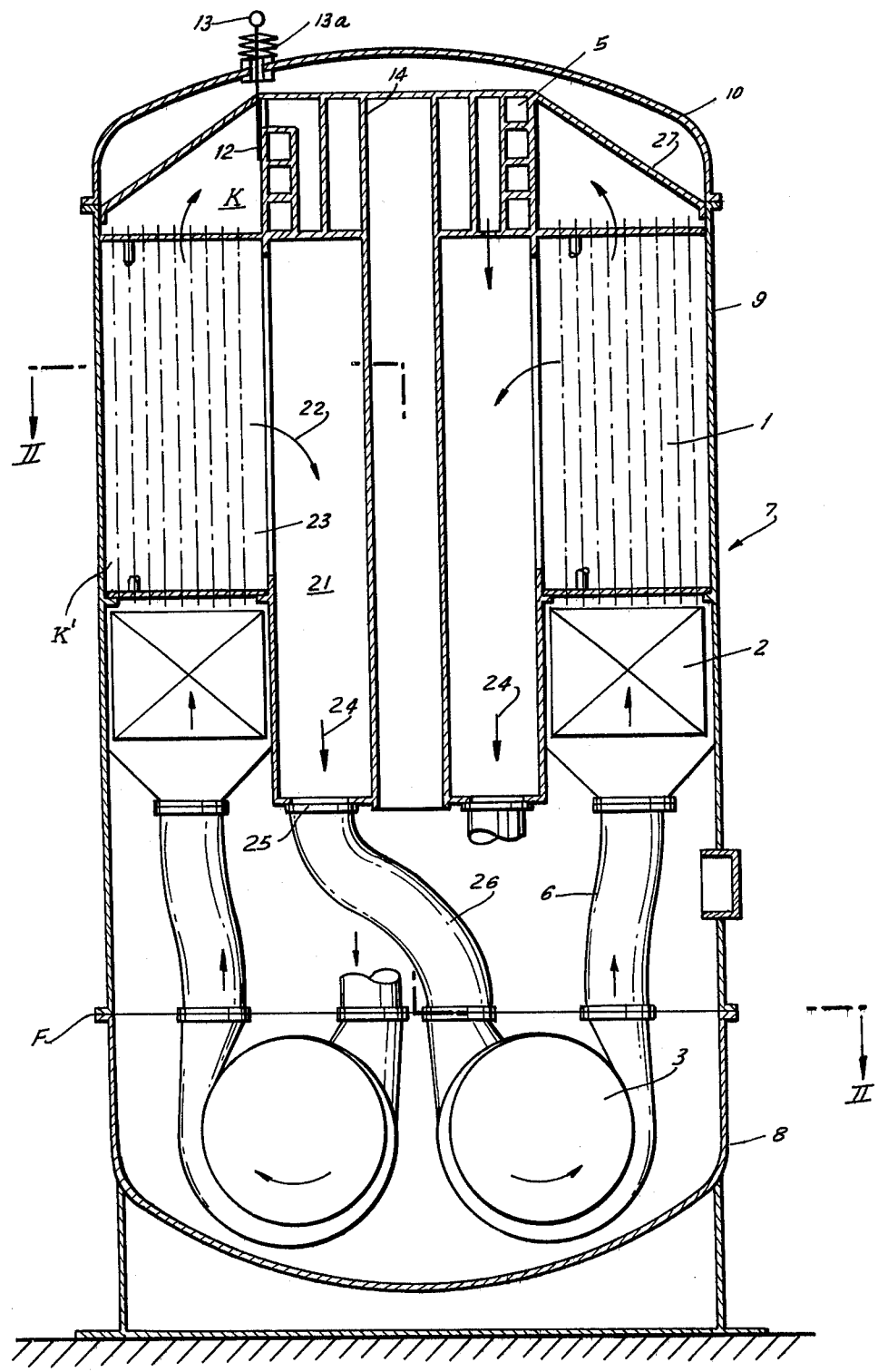
FIG. 1 is an axial cross-sectional view through an apparatus according to the invention.
Figure 2:
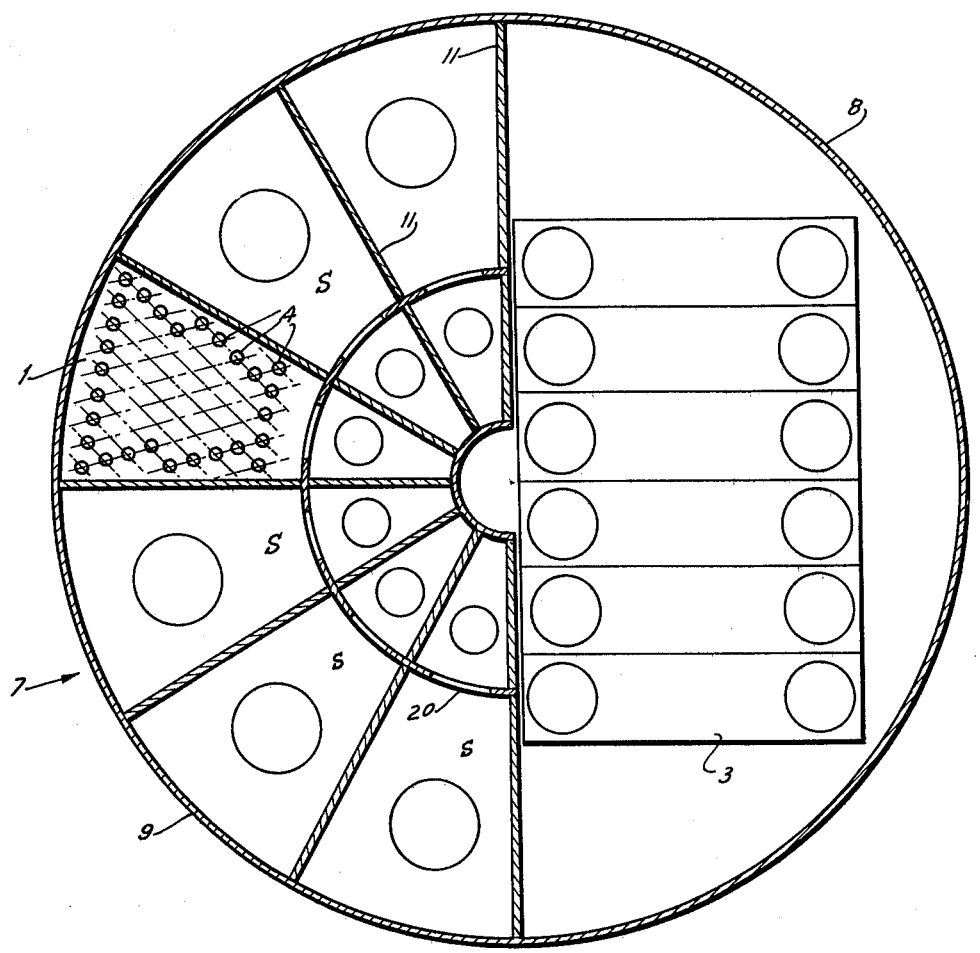
FIG. 2 is a section taken generally along the line II — II of FIG. 1.

The diagrammatic drawing of the present invention shows, purely schematically, twelve separating-nozzle units 1 of the type described above, respective coolers 2 communicating with the upstream end of each of the units 1, respective compressors 3, and associated gas passages or ducts 4, 5 and 6.

According to the invention, the apparatus comprises an upright column 7 with a lower portion 8, an intermediate portion 9 and an upper portion 10, separable from one another along respective flanges F and adapted to be bolted together to hermetically seal the column.

The column 7 is also formed with radial partitions 11 which define respective sectors S in the intermediate portion 9 of the column. Above and below these sectors, the partition walls form lower chambers K' and upper chambers K.

According to the invention, the sectors S receive the respective separating-nozzle units 1, the chambers K' below the sectors S receive the respective coolers 2 (which may be water-cooled heat exchangers), while the compressors 3 are disposed in the lower portion 8 of the column below the chambers K'.

The gas passages 4 run through the sectors parallel to the axis in accordance with separating-nozzle technology (see U.S. Pat. No. 3,708,964) and can be tubes as there disclosed. The gas ducts 5 which communicate with the upper ends of the sectors are provided at the upper portion 10 of the column in a multistage annular gas distributor whose flow cross-sections can be controlled by respective sliders, one of which is shown at 12 and which can be operated by actuators 13 externally of the tower. The actuators are sealed by bellows 13a with respect to the upper portion 10 or dome of the tower through which they extend.

Gas passages 6 run from each compressor to a respective cooler 2. The partitions 11 define within a sleeve 20 vertical passages 21 through which the gas passes from the respective sectors S in the direction of arrow 22 via windows 23. The gas then passes (arrows 24) downwardly through ports 25 into ducts 26 leading to the intake of the compressor 3 of a successive separating-nozzle unit. Thus, the twelve separating-nozzle units are connected as a cascade.

The column 7 is provided with a central mounting pipe 14 which can be supported by a frustoconical head 27 on the intermediate portion 9 of the column, the pipe 14 carrying the partitions 11 which are removable together with the pipe and head once the dome 10 has been removed, e.g. by a crane.

The lower portion 8 of the column receives two six-stage horizontal counterrotating radial compressors, each of which compresses the output gas from one of the separating-nozzle units and feeds it to the cooler 2 of a successive separating-nozzle unit. The lighter fraction is combined, in the head 7 with the heavy fraction from the intake side of the adjacent separating-nozzle unit. The heavy fraction is removed from the apparatus axially in each case and is mixed with a light fraction formed in an adjacent unit. As a consequence, as the gases pass from one unit to the next, there is an enrichment of fissionable uranium in them. The continuous return of one fraction in admixture with another fraction of a previous stage, of course, results in ultimate enrichment in accordance with cascade principles.

I claim:

1. An apparatus for isotopic enrichment of a gas, especially uranium enrichment, comprising:
   an upright column formed as a vacuum-tight multipartite container having an upper portion, an intermediate portion and a lower portion, said column being formed at least in the regions of said intermediate and upper portions with a central mounting tube;
   a multiplicity of radial partitions at least in said intermediate portion subdividing same into a plurality of sectors, said partitions being affixed to said mounting tube;
   respective separating-nozzle units in each of said sectors for the isotopic separation of gas therein into light and heavy fractions;
   respective coolers in said intermediate portion below each of said sectors for feeding gas to the respective unit;
   respective compressors in said lower portion of said column for compressing gas and feeding it to each of said coolers;
   duct means in said column for receiving respective fractions from the units of the units of the respective sectors and mixing a light fraction from one unit with heavy fraction from another unit prior to passage into the respective compressor whereby said units are connected in cascade, said duct means including an annular gas distributor in said upper portion of said column having respective passages communicating with each sector at the top thereof; and
   slider means for selectively controlling the flow cross-sections of said passages.

2. The apparatus defined in claim 1 wherein $n$ units are provided in said column, said compressors being subdivided into two $n/2$ - stage horizontal compressor assemblies.

3. The apparatus defined in claim 1 wherein each of said units comprises a multiplicity of central tubes extending through the respective sector and opening at said upper portion into the respective passages.

4. The apparatus defined in claim 3 wherein said duct means includes a central sleeve subdivided by said partitions into sectoral axial conduits, each of said conduits communicating at a lower end with an inlet to one of said compressors and being open radially into a respective sector.

5. The apparatus defined in claim 4 wherein twelve such units and sectors are provided.

6. The apparatus defined in claim 5 wherein said compressors are provided in two compressor assemblies each having six stages with respective inlets and outlets.

* * * * *